(12) United States Patent
Schreiber et al.

(10) Patent No.: US 10,100,913 B2
(45) Date of Patent: Oct. 16, 2018

(54) TRANSMISSION

(71) Applicant: WITTENSTEIN SE, Igersheim (DE)

(72) Inventors: Heiko Schreiber, Gnaschwitz (DE); Michael Schmidt, Reichenberg (DE); Thomas Bayer, Igersheim (DE)

(73) Assignee: WITTENSTEIN SE, Igersheim (DE)

( * ) Notice: Subject to any disclaimer, the term of this patent is extended or adjusted under 35 U.S.C. 154(b) by 379 days.

(21) Appl. No.: 15/094,655

(22) Filed: Apr. 8, 2016

(65) Prior Publication Data

US 2016/0298750 A1 Oct. 13, 2016

(30) Foreign Application Priority Data

Apr. 10, 2015 (DE) .................. 10 2015 105 520

(51) Int. Cl.
    *F16H 49/00* (2006.01)

(52) U.S. Cl.
    CPC ..... *F16H 49/001* (2013.01); *F16H 2049/003* (2013.01)

(58) Field of Classification Search
    CPC .................................................. F16H 49/001
    See application file for complete search history.

(56) References Cited

U.S. PATENT DOCUMENTS

| | | | | |
|---|---|---|---|---|
| 4,798,104 A | * | 1/1989 | Chen ...................... | F16H 25/06 475/159 |
| 2014/0256495 A1 | * | 9/2014 | Waide ................... | F16H 49/001 475/167 |
| 2016/0298747 A1 | * | 10/2016 | Schreiber .............. | F16H 49/001 |
| 2016/0298748 A1 | * | 10/2016 | Schreiber .............. | F16H 49/001 |
| 2016/0298749 A1 | * | 10/2016 | Burger .................. | F16H 49/001 |
| 2017/0211677 A1 | * | 7/2017 | Kiyosawa ............. | F16H 49/001 |

FOREIGN PATENT DOCUMENTS

| | | |
|---|---|---|
| DE | 102007011175 A1 | 9/2008 |
| DE | 102007016189 A1 | 10/2008 |
| DE | 102007058605 A1 | 6/2009 |
| DE | 102012104083 A1 | 11/2013 |

\* cited by examiner

*Primary Examiner* — Terence Boes

(74) *Attorney, Agent, or Firm* — Meunier Carlin & Curfman LLC

(57) ABSTRACT

Disclosed herein is a transmission having a tooth holder for holding teeth of a toothed ring, said teeth being arranged around an axis of rotation of the transmission, wherein the teeth are arranged in the tooth holder in such a way as to be movable and to be guided in a radial direction. The transmission furthermore has a drive element, which is rotatable about the axis of rotation, for driving the teeth in a radial direction, wherein the drive element has a cam contour with lobes in a radial direction. Swivel segments are arranged between the teeth and the drive element. A thrust washer is arranged in the tooth holder, at least on one side in an axial direction of the swivel segments. A method for producing a transmission according to the embodiments described herein is furthermore described.

14 Claims, 2 Drawing Sheets

TRANSMISSION

CROSS-REFERENCE TO RELATED APPLICATIONS

This application claims the benefit of German Patent Application No. 102015105520.1, filed on Apr. 10, 2015, the disclosure of which is expressly incorporated herein by reference in its entirety.

FIELD OF THE INVENTION

The invention relates to a transmission and to a method for producing or operating a transmission.

PRIOR ART

From the prior art are known transmissions which comprise toothed segments that are mounted so as to be radially movable in a tooth holder. To drive the toothed segments, drive elements having profiling, e.g. cam discs, are used. The teeth of the toothed segments engage in toothing, resulting in a relative movement between the tooth holder with the toothed segments and the toothing. Here, the relative movement between the toothing and the toothed segments is less by at least one order of magnitude than the movement of the drive element having the profiling. In this way, it is possible to obtain high transmission ratios, one example of such a transmission being disclosed in DE 10 2007 011 175 A1.

The toothed segments can be arranged on swivel segments, for example. The swivel segments can extend in an axial direction along the toothed segment and are arranged in a radial direction between a bearing and the toothed segment. In this arrangement, axial support must be provided for the swivel segments. In known systems, axial bearing washers are used to support the swivel segments axially on the drive element. However, known solutions exhibit undesirably high wear.

DISCLOSURE OF THE INVENTION

It is an object of the invention to specify a transmission which is improved as compared with transmissions known from the prior art, particularly as regards wear and service life. It is furthermore an object of the invention to specify a production method for producing a transmission of this kind.

The object is achieved by means of a transmission, in particular a coaxial transmission or a linear transmission, according to Claim 1 and by means of a method for producing a transmission according to the additional independent claim. Advantageous developments and embodiments will become apparent from the dependent claims and from this description.

Typical embodiments of transmissions have teeth which are guided radially in a tooth holder and which can be driven in a radial direction by a drive element. The drive element is typically a cam disc having external profiling with radial lobes or internal profiling with radial lobes. The latter embodiment is generally implemented in conjunction with a gearwheel having external toothing or a rack, wherein the teeth can be driven radially inwards so that they engage in the external toothing of the gearwheel or of the rack. The former embodiment is generally embodied with an annulus having internal toothing, wherein the teeth can be driven radially outwards so that they engage in the internal toothing.

According to embodiments of the transmission according to the invention, swivel segments are arranged between the teeth in the tooth holder and the drive element. The swivel segments can allow a defined movement of the teeth, for example, and, in particular, can allow the movement of the teeth in accordance with the shape of the cam disc. The swivel segments are typically situated in a radial direction between the teeth and the drive element. Axial support for the swivel segments is provided by a thrust washer on at least one side of a tooth. According to embodiments described herein, the thrust washer is arranged in the tooth holder. The thrust washer is typically pressed in, in particular lightly pressed in. A slight clearance of the thrust washer relative to the tooth holder is also possible.

The arrangement of the thrust washer for conjoint rotation on the tooth holder can be accomplished by fastening or fixing the thrust washer on the tooth holder, for example, in particular in the form of a press fit or as a transition fit or as an adhesive bond. In this case, the thrust washer can be fastened directly or indirectly on the tooth holder, for example. Indirect fastening can be performed, for example, if a further element, such as a receptacle for the thrust washer, a fastening means, a separating washer or the like, is arranged between the thrust washer and the tooth holder. In one embodiment, the thrust washer can be arranged in the tooth holder and/or arranged for conjoint rotation on the tooth holder by being formed integrally with the tooth holder. In other embodiments, the thrust washer is placed in a centring means.

The transmission described herein makes it possible to provide sufficient support for the swivel segments, which supports only the relative stroke motion of the swivel segments. The arrangement of the thrust washer for conjoint rotation on the tooth holder gives rise to significantly lower frictional losses between the swivel segment and the thrust washer than is the case with a thrust washer that moves with the drive element. The lower sliding speeds and short sliding distances of the stroke motion which are associated with known arrangements have only a poor capacity to build up a load-bearing lubricating film and are therefore subject to high wear, which leads to a shortening of the life of the support. The transmission according to embodiments of the invention eliminates these disadvantages.

According to one embodiment, a thrust washer can be provided in the tooth holder and/or can be provided for conjoint rotation on the tooth holder on each of two axially opposite sides of the swivel segment. It is thereby possible to provide axial support on both sides of the swivel segment, further increasing the operational reliability of the transmission.

In one embodiment, the transmission according to the invention can have a thrust washer, which is arranged directly adjoining the swivel segments. For example, the thrust washers can be in contact with the swivel segments during the operation of the transmission. Typically, the swivel segments perform a stroke motion together with the teeth when the drive element with the cam contour having lobes rotates. According to embodiments described herein, the swivel segment can be in contact with the thrust washer over the entire stroke height, i.e. over the difference in height caused by the lobes of the cam contour, as will be described in greater detail below. In other embodiments, the thrust washer can be arranged directly adjoining the swivel segments, with the spacing or clearance between the thrust washer and the swivel segment in the axial direction being no greater than 2 mm or no greater than 1 mm.

In one embodiment of the transmission according to the invention, rolling elements are arranged between the drive element and the swivel segment. Here, the drive element can provide a flange for the axial support of the rolling elements. Typically, flanges are arranged on the drive element on both sides of the rolling elements. In this way, axial support for the rolling elements in both directions is achieved. For example, the rolling bearings can be made available in the form of needle rollers, which can be supported axially on the flange of the drive element. This represents separate axial support for the swivel segments and the rolling bearings and thus allows optimum adaptation of the individual bearing elements to the specific requirements. For example, the thrust washer for supporting the swivel segments can be subjected to one surface treatment (as will be described in detail below), while the flange of the drive element for supporting the rolling elements can be subjected to a different surface treatment or even to no surface treatment. This helps to reduce production costs since the separate support means that only those parts which benefit from surface treatment during operation of the transmission are given special treatment.

According to one embodiment, the flange which serves as a support for the rolling elements can be formed integrally with the drive element. In another embodiment, the flange can be fastened directly or indirectly on the drive element. Typically, a flange is provided on both sides of the drive element in the axial direction.

A person skilled in the art will understand that the transmission according to the invention is not limited to a rolling bearing assembly but that the transmission can also be provided with a magnetic bearing assembly or a sliding bearing assembly for the swivel segments, for example.

In one embodiment of the transmission according to the invention, the thrust washer has a radial extent which corresponds at least to the difference between the radii of the drive element minus a thickness of the swivel segments. In further typical embodiments, the radial extent corresponds at least to the stroke motion of the swivel segments in a radial direction. In further typical embodiments, the radial extent corresponds at least to the stroke motion of the swivel segments in a radial direction plus a thickness of the swivel segments. As a result, the thrust washer can have a radial extent which is dependent on the lobes of the drive element. For example, the thrust washer can have a radial extent such that the swivel segment is continuously in contact with the thrust washer or does not have to slide over any edges in its stroke motion during the operation of the transmission. This allows the swivel segments to perform a stroke motion without having to slide completely over edges. If there is no need to slide over edges, operation of the transmission is smoother and subject to less wear. In other embodiments, the corresponding side face of the swivel segment is in full surface contact with the thrust washer.

According to one embodiment of the transmission according to the invention, the thrust washer can be designed as an annular thrust washer, in particular as an annular thrust washer for all swivel segments of the transmission.

The thrust washer of the transmission according to the invention can be embodied in such a way that it is less rough and/or harder than a side face of the swivel segment which faces the thrust washer (or of the entire swivel segment). In particular, the surface of the thrust washer can be configured in such a way, or at least the surface of the side of the thrust washer which faces the swivel segment can be configured in such a way, that it is less rough and/or harder than a side face of the swivel segment which faces the thrust washer. In one example, the surface of the thrust washer can be modified by means of a finishing process and, additionally or alternatively, by means of a coating in such a way that the surface of the thrust washer is less rough, has a relatively good surface contact area and is harder than the swivel segment running against it. In contrast, the core hardness of the thrust washer can be relatively low, which reduces production costs. In one embodiment, the thrust washer can be subjected to several processes during the production process, in the following process sequence for example: turning, barrel finishing, coating. As an alternative to barrel finishing, other finishing methods could generally be used, e.g. roller-burnishing.

In one embodiment, the coating of the thrust washer can comprise: an amorphous carbon layer, e.g. a DLC (Diamond Like Carbon) layer, a chromium layer, layers applied by PVD coating, crystalline carbon layers and/or diamond coatings. According to embodiments of the invention, the amorphous carbon layer can comprise a-C, ta-C, a-C:Me, a-c:H, ta-C:H, a-C:H:Me, and/or a-C:H:X, wherein Me signifies metallic doping elements and X signifies nonmetallic doping elements. In some embodiments, which can be combined with other embodiments, the layer applied by PVD coating can comprise TiN, CrN, TiAlN, TiCN, TiSiN, ZrN, and/or AlTiN. These layers can be produced easily and at low cost.

According to embodiments of the invention, in each case the swivel segments and/or in each case the teeth have a structure which is suitable for allowing tilting of a tooth relative to a swivel segment and/or for preventing sliding of a tooth relative to a segment. Thus, on the one hand, it is possible for the swivel segments to be held under the teeth and, on the other hand, tilting movements which may be necessary owing to the geometry of the transmission are possible.

According to one embodiment, the invention comprises a method for producing a transmission described herein. For example, the method comprises steps which can be used to produce the individual parts of the transmission described herein or to assemble the transmission described herein. A person skilled in the art will understand that the method for producing the transmission can comprise steps ranging from the forming of the individual parts to (surface) treatment and assembly or only partial aspects thereof.

In one embodiment of the method according to the invention, the method comprises a finishing process for the thrust washer which is carried out after the forming of the thrust washer and before the installation thereof in the transmission, for example. In particular, the method comprises a coating process (after the finishing process for example). The coating process can be embodied in such a way that a coating as described above is formed on the surface of the thrust washer. In particular, it is possible for the coating process to be carried out (only) on the side of the thrust washer which faces the swivel segment in order to reduce costs.

BRIEF DESCRIPTION OF THE DRAWINGS

Further advantages and features of preferred embodiments of the invention are explained below with reference to the attached drawings, wherein the figures show.

DESCRIPTION OF PREFERRED ILLUSTRATIVE EMBODIMENTS

Typical embodiments are described below with reference to the figures, although the invention is not restricted to the illustrative embodiments, the scope of the invention being, on the contrary, defined by the claims.

Figure 1:
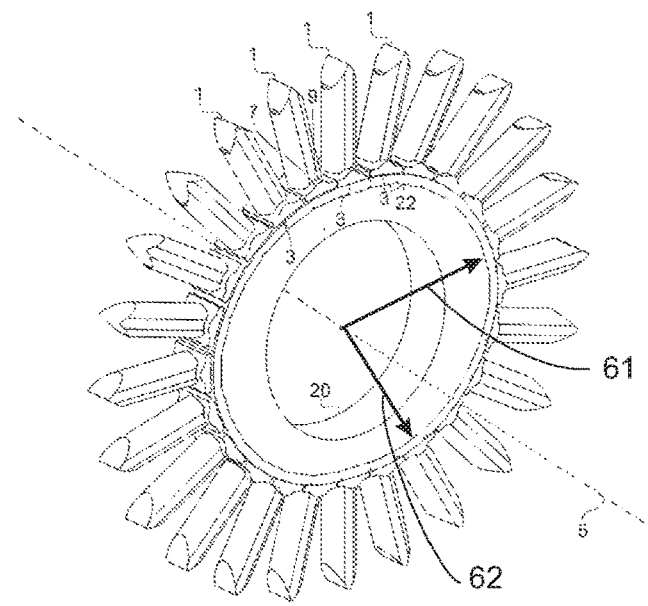
FIG. 1 is a schematic perspective view of a typical embodiment of parts of a transmission according to the invention.

FIG. 1 shows part of a transmission according to one embodiment, wherein the transmission comprises a toothed ring with teeth 1.

To make the elements shown clearer, FIG. 1 does not show a tooth holder. Moreover, just one encircling row of teeth is shown. Typically, there are two adjacent axially parallel encircling rows, wherein two teeth are mounted adjacent to one another on a swivel segment. This increases the stability of running of the swivel segment.

Moreover, not every tooth is provided with a reference sign in FIG. 1 for the sake of greater clarity. This applies similarly also to other component elements of which there are several in the embodiment. The teeth are arranged on swivel segments 3. The swivel segments 3 comprise beads 7, which are aligned coaxially with an axis of rotation 5 and which engage in corresponding depressions in the teeth 1.

Figure 2:
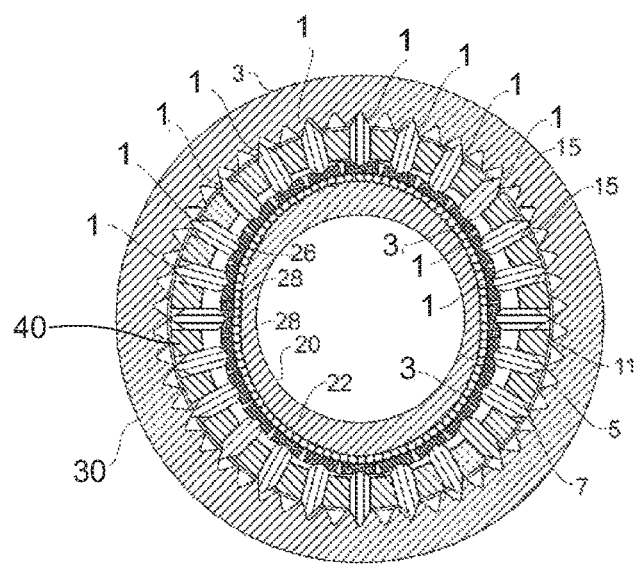
FIG. 2 is a schematic sectional view in a radial direction through a typical embodiment of the transmission.

The teeth 1 are guided radially in a tooth holder, as shown analogously in FIG. 2 or in WO 2008/028540 A1. The teeth 1 are driven in a radial direction by a drive element 20. On its circumference, the drive element 20 is designed as a cam disc with two lobes, with the result that each tooth 1 is driven radially outwards twice in a radial direction during one revolution of the drive element 20.

A first radius 61 and a second radius 62, different from the first, of the drive element 20 are also depicted in FIG. 1. In the example shown, the first radius 61 and the second radius 62 represent the extreme points of the cam contour or profiling of the drive element.

In a radial direction, the extent of a thrust washer in embodiments of a transmission according to the invention corresponds at least to the difference between the first radius 61 and the second radius 62, minus a thickness of the swivel segment. As a result, the swivel segment can always be supported axially on the thrust washer.

The drive element 20 has two flanges 22, 23, which are fastened to the drive element in the example shown but which, as mentioned above, can also be formed integrally with the drive element.

The flanges serve as axial support for the rolling elements between the drive element and the swivel segments, wherein the rolling elements are not shown in the view in FIG. 1.

Depressions in the teeth 1 rest on the beads 7 of the swivel segments 3, allowing rotation of the teeth 1 relative to the segments 3.

In typical embodiments, the beads have a partially cylindrical shape, the centre line of which coincides at least substantially with the side of the segments which is adjacent to the rolling elements or, typically, is no more than 10%, no more than 20% or no more than 50% of the diameter of the rolling elements away from the side adjacent to the rolling elements. In this way, an axis of tooth rotation for the supported teeth which is at least in the vicinity of the side adjacent to the rolling elements is created for each swivel segment. In this way, additional movements of the swivel segments due to travelling along the profiling of the drive element can be avoided.

Such a degree of rotational freedom is necessary since the teeth 1 are guided radially in a tooth holder 40 in the form of a circular ring but the segments of the bearing ring must adapt to the cam path of the drive element 20, as can be seen in FIG. 2. This movement of the swivel segments 3 relative to the teeth 1 is also referred to as tilting. The bead 7 and the depression prevent slipping off or sliding of each swivel segment 3 relative to the relevant tooth 1.

In other embodiments, spherical plain bearings or other structures can be provided in order to allow tilting or to prevent sliding of the segment relative to the tooth.

FIG. 2 shows a sectional view through an embodiment of a transmission 1 according to the invention in the form of a coaxial transmission. The sectional view in FIG. 2 shows a section which is taken in a radial direction approximately in the centre of the teeth, with the result that the thrust washer for the swivel segments is not shown in FIG. 2. A sectional view in an axial direction, which shows the thrust washer, is provided by FIG. 3. In the embodiment in FIG. 2, the teeth 1 are supported by a segmented bearing assembly.

In the example shown in FIG. 2, the segmented bearing assembly comprises swivel segments 3 which differ from those in FIG. 1 and which each have a recess in which a bead 26 of the teeth 1 engages in each case. Although this means that the axis of rotation of the tooth in each case lies within the tooth 1 and therefore does not have the above-described advantages of the axis of tooth rotation close to the rolling bearing surface of the swivel segment, such an embodiment may be simpler to manufacture. A swivel segment 3 is provided for each of the teeth 1. In typical embodiments, precisely one swivel segment is provided for precisely two, precisely three or precisely four parallel teeth, wherein the teeth are arranged in parallel and typically have an identical axis of tooth rotation. The teeth 1 are arranged in a tooth holder 40, in particular being arranged so as to be movable radially in the tooth holder 40.

The swivel segments 3 are movable relative to one another, thus allowing the spacings between the swivel segments 3 to be changed according to the radial position of the teeth 1. This allows guidance largely free from constraint and allows radial driving of the swivel segments 3 in a manner largely free from constraint by the profiling of the drive element 20. To minimize the frictional resistance between the profiling and the swivel segments 3, needle rollers 28 are provided as rolling elements. In other embodiments, balls or other rolling elements are provided to support swivel segments. Typical swivel segments rest at least partially on the flanges in order to prevent excessive tilting of the swivel segments.

The teeth 1 are produced from steel and are flexurally stiff, as are the other components of the transmission. It is also possible for different steel grades or other metal alloys, such as titanium or nickel alloys, to be used, and plastic transmissions are also typical as embodiments as well.

Figure 3:
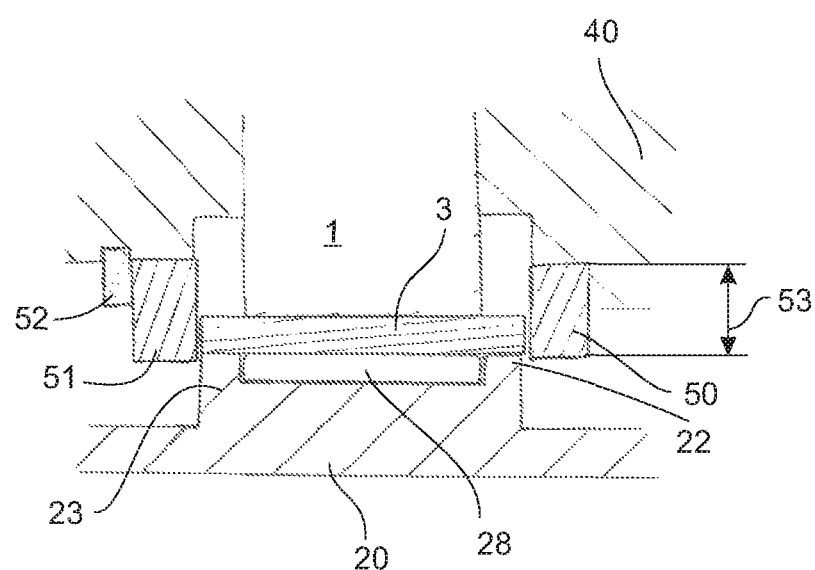
FIG. 3 is a schematic sectional view in an axial direction through a typical embodiment of the transmission.

In a transmission according to embodiments of the invention, wear and the tendency for scuffing of the axial support for the swivel segments can be reduced. FIG. 3 shows a detail of a transmission according to the invention, in which only the stroke motion of the swivel segments is supported and there is no rotary motion between a thrust washer and the tooth holder.

FIG. 3 shows a detail of a sectional view of the transmission according to the invention in the axial direction. In the embodiment shown, the drive element 20 has integrally formed flanges 22, 23, which make available axial support for the rolling elements 28. Arranged on the rolling element 28 is the swivel segment 3, which can be designed as described above and, for example, comprises a bead, which is not shown in the sectional illustration in FIG. 3. The tooth 1 is seated on the swivel segment 3 and can perform a stroke motion substantially perpendicular to the drive element 20.

Typically, the centre of rotation of the tooth 1 can be situated on the bearing side of the swivel segment 3 which faces away from the tooth.

In the embodiment shown in FIG. 3, the swivel segment 3 is supported axially by two thrust washers 50 and 51. The embodiment shown in FIG. 3 shows the direct fixing or fastening or centring of the thrust washers 50, 51 on the tooth holder 40.

Typically, the thrust washers are connected at least for conjoint rotation to the tooth holder or are inserted with little play in the tooth holder in order to minimize relative movements between the swivel segments and the thrust washers. For example, one or both thrust washers 50, 51 can be fastened directly on the tooth holder by welding, screwing, adhesive bonding, pinning or the like. In one embodiment, a thrust washer can be formed integrally with the tooth holder, for example.

As explained above, the swivel segment can be in continuous contact with one of the two thrust washers or with both thrust washers, ensuring, in particular, that there are no edges to be overcome during the stroke motion of the swivel segment. In the example shown, one thrust washer 51 is in contact with the swivel segment 3, this being ensured by a fastening or centring element 52, while the other thrust washer 50 has a spacing with respect to the swivel segment 3.

The thrust washer typically has a radial extent which corresponds to the difference between the different radii of the drive element, in some embodiments also minus a swivel segment thickness or plus a swivel segment thickness, as with the difference between the first radius 61 and the second radius 62 for example, as shown in FIG. 1. Typically, the difference between the radii can be 20% at most or 10% at most or 2% at least or 5% at least of the maximum diameter of the drive element in each case. A person skilled in the art will understand that the values can also apply to the second thrust washer 51. The choice of radial extent for the thrust washer depending on the difference between the radii ensures smooth operation of the transmission since continuous axial support of the swivel segment is ensured or since no edges have to be crossed by the swivel segment during the stroke motion.

According to one embodiment of the transmission according to the invention, the thrust washer can be produced from quenched and tempered steel, in particular being produced by turning from quenched and tempered steel. In one example, the abovementioned finishing process for machining at least the side of the thrust washer which faces the swivel elements can be carried out by barrel finishing to a mean roughness Ra of at most 0.1 or at most 0.3 and/or at least 0.005 or at least 0.01.

In one embodiment, the transmission according to the invention can provide a swivel segment for two teeth at most. For example, two teeth can be arranged axially adjacent to one another on a correspondingly designed swivel segment.

A person skilled in the art will understand that the transmission described can also be used as a linear drive. In embodiments different from those shown in the figures, it is also possible to use the annulus as an input and the cam disc as an output.

The invention claimed is:

1. A transmission having
a tooth holder for holding teeth of a toothed ring, said teeth being arranged around an axis of rotation of the transmission, wherein the teeth are arranged in the tooth holder in such a way as to be movable and to be guided in a radial direction,
a drive element, which is rotatable about the axis of rotation, for driving the teeth in a radial direction, wherein the drive element has a cam contour with lobes in a radial direction,
wherein swivel segments are arranged between the teeth and the drive element and wherein a thrust washer is arranged in the tooth holder, at least on one side in an axial direction of the swivel segments,
wherein rolling elements are arranged between the drive element and the swivel segment, and the drive element provides a flange for the axial support of the rolling elements.

2. The transmission of claim 1, wherein the thrust washer is arranged for conjoint rotation on the tooth holder.

3. The transmission of claim 1, wherein the thrust washer is arranged axially directly adjoining the swivel segments.

4. The transmission of claim 1, wherein in each case the swivel segments and/or in each case the teeth have a structure which is suitable for allowing tilting of a tooth relative to a swivel segment and/or for preventing sliding of a tooth relative to a swivel segment in a circumferential direction.

5. The transmission of claim 1, wherein the flange is formed integrally with the drive element.

6. The transmission of claim 1, wherein the thrust washer has a radial extent which corresponds at least to the difference between the radii of the drive element minus a thickness of the swivel segments.

7. The transmission of claim 6, wherein the radial extent of the thrust washer allows continuous contact between the swivel segments and the thrust washer during operation of the transmission.

8. The transmission of claim 1, wherein the thrust washer is embodied in such a way that it is less rough and/or harder than a side face of the swivel segment which faces the thrust washer.

9. The transmission of claim 1, wherein the thrust washer is subjected to a finishing process and/or has a coating.

10. The transmission of claim 9, wherein the coating of the thrust washer comprises at least one layer from the group comprising: an amorphous carbon layer, a chromium layer, layers applied by PVD coating, crystalline carbon layers and/or diamond coatings.

11. The transmission of claim 10, wherein the amorphous carbon layer comprises a-C, ta-C, a-C:Me, a-c:H, ta-C:H, a-C:H:Me, and/or a-C:H:X, wherein Me signifies metallic doping elements and X signifies nonmetallic doping elements and/or wherein the layer applied by PVD coating comprises TiN, CrN, TiAlN, TiCN, TiSiN, ZrN, and/or AlTiN.

12. A method for producing the transmission of claim 1.

13. The method of claim 12, wherein the thrust washer is subjected to a finishing process during the production of the transmission.

14. The method of claim 12, wherein the thrust washer is subjected to a coating process during the production of the transmission in order to coat the thrust washer at least on the side face facing the swivel segment with a coating comprising at least one layer from the group comprising: an amorphous carbon layer, a chromium layer, layers applied by PVD coating, crystalline carbon layers and/or diamond coatings.

* * * * *